Figure 1:
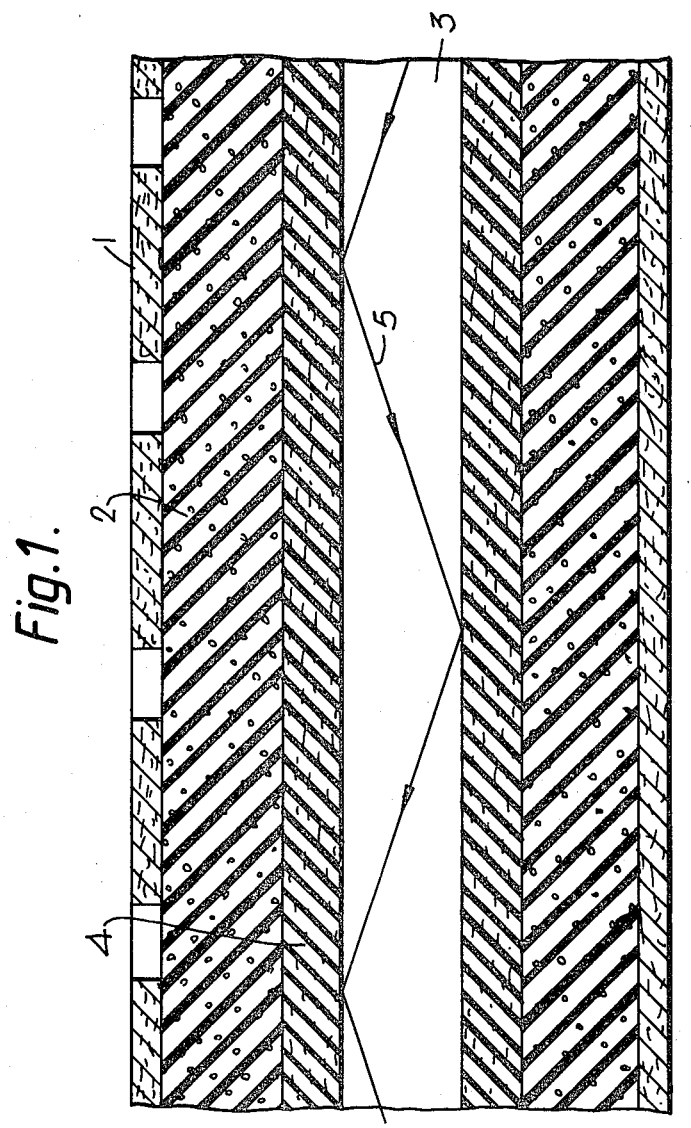

United States Patent [19]

Murphy

[11] 4,386,269
[45] May 31, 1983

[54] METHOD AND DEVICE FOR DETECTING LEAKS FROM PIPELINES

[75] Inventor: Richard J. Murphy, Sandy Lane, England

[73] Assignee: Avon Rubber Company Limited, Melksham, England

[21] Appl. No.: 206,087

[22] Filed: Nov. 12, 1980

[30] Foreign Application Priority Data

Nov. 15, 1979 [GB] United Kingdom ................. 7939551
Jun. 6, 1980 [GB] United Kingdom ................. 8018704

[51] Int. Cl.$^3$ ...................... G01M 3/38; G01M 11/08
[52] U.S. Cl. .................................. 250/227; 73/40.5;
73/40.5 R; 340/605
[58] Field of Search ......................... 73/40.5; 250/227;
350/96.33, 96.23; 340/605; 374/4

[56] References Cited

U.S. PATENT DOCUMENTS

| | | | |
|---|---|---|---|
| 2,190,027 | 2/1940 | Jordan | 250/227 |
| 3,051,038 | 8/1962 | Duke | 350/96.33 X |
| 3,564,526 | 2/1971 | Butts | 340/605 X |
| 3,997,241 | 12/1976 | Nishida et al. | 350/96.33 |
| 4,045,668 | 8/1977 | Pitt et al. | 250/227 |
| 4,113,349 | 9/1978 | Stiles | 350/96.33 |
| 4,151,747 | 5/1979 | Gottlieb et al. | 350/96.33 X |
| 4,159,420 | 6/1979 | Tsunoda | 250/227 |
| 4,318,588 | 3/1982 | Zeidler et al. | 350/96.23 |

FOREIGN PATENT DOCUMENTS

| | | | |
|---|---|---|---|
| 2910135 | 9/1979 | Fed. Rep. of Germany | 350/96.23 |
| 2825845 | 1/1980 | Fed. Rep. of Germany | 350/96.23 |
| 2046625 | 7/1980 | United Kingdom | 350/96.33 |
| 1601003 | 10/1981 | United Kingdom | 350/96.33 |

OTHER PUBLICATIONS

Publ. "Flexible Adiabatic Light Guide of Silicon Rubber" by Fukui et al. *Japanese Journal of Applied Physics* 1/14/71, pp. 1597–1600.

Primary Examiner—Daniel M. Yasich
Attorney, Agent, or Firm—William R. Hinds

[57] ABSTRACT

To detect leaks from pipelines carrying fluids, especially oil, light is transmitted through a fibre-optic held in proximity with the pipeline. The fibre-optic is surrounded by a medium of which the refractive index is altered by the influence of the leaked fluid. In a preferred embodiment the medium is a silicone rubber (4) of which the refractive index is normally lower than that of a quartz fibre optic (3), but of which the index increases to that of the quartz or above when oil (7) soaks into it through a permeable cladding (1) and elastomeric protective layer (2), thus rendering the fibre optic non-internally—reflective so that light (6) is absorbed. Control means linked to a light receiver detect that change and the position of the leak is located to within the length of the optic. In another embodiment the medium is a liquid which is expelled from around the optic by the action of leaked fluid.

11 Claims, 6 Drawing Figures

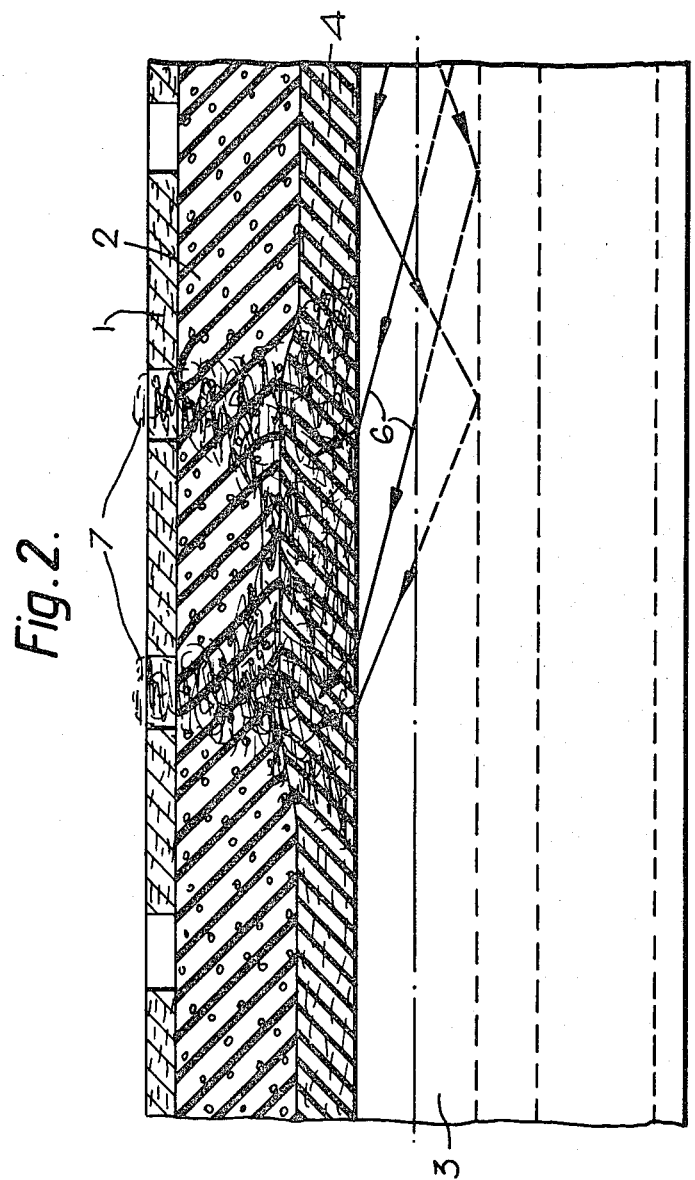

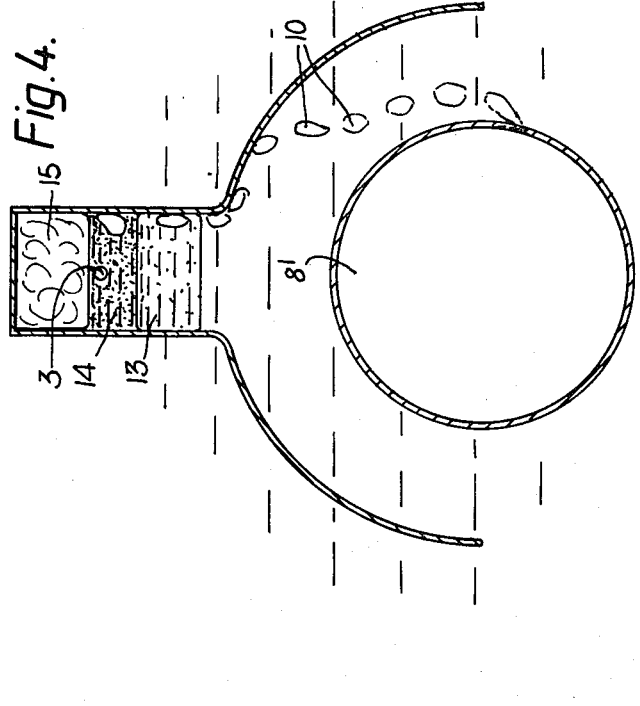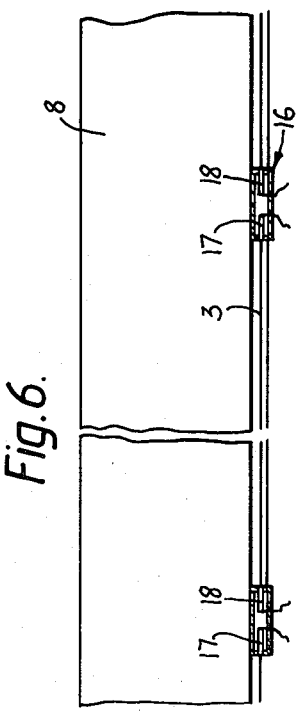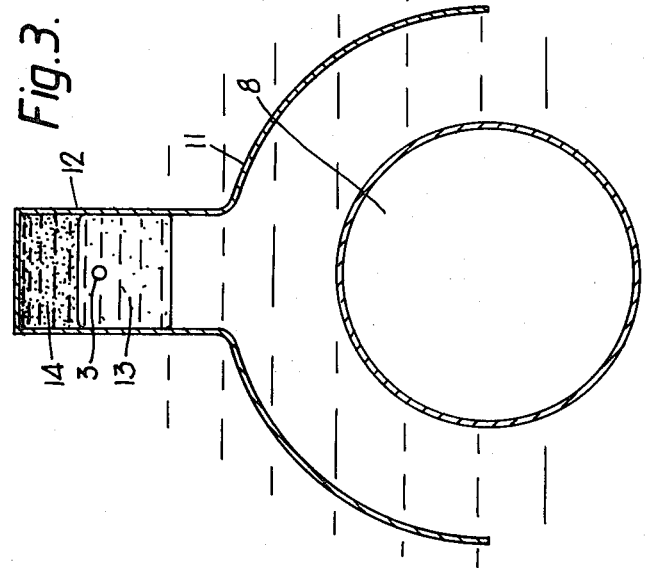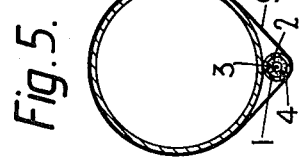

METHOD AND DEVICE FOR DETECTING LEAKS FROM PIPELINES

FIELD OF THE INVENTION

The present invention relates to the detection of leakages from pipelines.

BACKGROUND OF THE INVENTION

It is becoming increasingly important not only from the economic point of view but also from the environmental point of view that leakages in oil, gas or other chemical pipelines shall be detected within a comparatively short time. Although catastrophic breaks will rapidly become evident, up to now the detection of small leaks and seepages has been very difficult especially when the pipelines are inaccessible, for example being under ground or under water.

SUMMARY OF THE INVENTION

The present invention sets out to detect such leakages by causing the medium leaking from the pipeline to change the environment around a light-conducting core such as a fibre optic which is adjacent to the pipeline.

The function of such cores is to conduct light as efficiently as possible and therefore they are surrounded by some medium which, having a lower refractive index than the material of the core, causes total internal reflection at the boundary of the core so that light is not lost from it.

The invention is based on the realisation that if that medium becomes changed into one which has an equal or preferably a higher refractive index than the core material then light incident on the wall of the core will be able to escape from it and, from the point of view of a detector positioned along the core, light will appear to have become extinguished or at least attenuated.

In one form of the present invention the core is surrounded by an elastomeric sheath which in principle is conventional and normally has a refractive index less than that of the core. This elastomer is usually a silicone-based rubber. This core is placed in juxtaposition with the pipeline, preferably running along parallel with it and attached to it. If oil or other liquid chemical escapes from the pipeline it will seep into the silicone rubber which is permeable to such materials, alter its refractive characteristics, and cause a change in the internal reflectivity of the core and hence in its light conductive capacity. At suitable intervals along the pipeline light emitters and detectors are positioned so that loss of light conductivity within a given portion of the core is detected and signalled to a control station.

In another form of the invention which is useful especially when the pipeline is under water and also when the material within the pipeline is of a lower refractive index than the core, the core is surrounded by a liquid sheath which has a lower refractive index than the core. The sheath is entrapped within ducting which contains also a comparatively dense liquid such as water (or is open to external water surrounding the pipeline) and which has a closed head above the core. Material seeping from the pipeline is trapped in the closed head and therefore tends to displace the liquid sheath from around the core. When it has so displaced the sheath, the reflectivity of the core changes. If the refractive index of the material from the pipeline is lower than that of the core so that displacement of the sheath would continue to give internal reflection then the ducting includes also a third liquid. This third liquid is of lower specific gravity than the liquid of the sheath but has a higher refractive index than the core so that as the liquid sheath and the third liquid are displaced by material which leaks from the pipeline and is trapped in the duct, the third liquid is brought into contact with the core and being of higher refractive index lessens its conductivity as before.

DESCRIPTION OF THE DRAWINGS AND OF PARTICULAR EMBODIMENTS

Particular embodiments of the invention will now be described with reference to the accompanying drawings wherein:

FIGS. 1 and 2 show a first embodiment of detector having a solid permeable sheath, seen in radial section and in two conditions, FIG. 3 show a second embodiment in cross-section with no leak occurring, FIG. 4 shows the second embodiment with a leak occurring, FIG. 5 shows a sectional view of a pipeline with the first embodiment juxtaposed with it, and FIG. 6 shows diagrammatically a side view of a length of the pipeline of FIG. 5.

In the first embodiment, which is at present the preferred embodiment, a leak detector device takes the form of a cylindrical object of indefinite length of which the outer wall is a cladding 1 which is perforate or otherwise permeable and which has within it a protective layer 2 of foam rubber or like elastomer which is open-celled or otherwise permeable. At the centre of the cylinder is housed a light conductive core 3 such as a quartz fibre optic core surrounded by its conventionally solid sheath 4 of permeable material such as silicone rubber. The refractive index of the sheath 4 is normally lower than that of the quartz so that light, indicated at 5, suffers total internal reflection every time it is incident upon the wall of the core and is transmitted efficiently along that core. Referring to FIG. 6 light is injected into the core by a light source 17 positioned at appropriate distances along it, the distances being appropriate to the intensity of the light used and the core being used and also to the precision with which it is desired to locate leakages which might occur. There is also inserted adjacent each light source 17, but directed towards a remote such light source 17, a detector 18 for the light transmitted by the core and the sources and detectors are controlled remotely.

They may be actuated continuously or intermittently. The detector is placed in juxtaposition with a pipeline 8 carrying oil or other liquid material having a refractive index higher than that of the quartz. It is very easy to secure the detector to the pipeline by, e.g. straps 9, or lay it so as to touch the latter. Two or more such detectors may be associated with a single pipeline at different positions around its periphery. Any liquid such as oil 7 leaking from the pipeline can enter through the apertures in the perforated cladding 1 and this is seen in FIG. 2 it permeates the foam protective layer 2 and enters the sheath 4, causing (incidentally) swelling or expansion of the sheath, which is taken up by compression of the elastomeric layer. But when the material comes into contact with the outer wall of the quartz core, it will alter the reflective action of that core and when light indicated by arrows 6 is internally incident upon these walls, instead of total internal reflection there will be partial or complete loss of the light to the outside of the core. Such loss is recorded at the detector as an attenuation or extinction of the light source and the existence and the location of the leak is established.

The response time of this embodiment is a function of the permeability of the sheath to the leaking liquid (largely governed by its degree of cross-linking) and can be adjusted by appropriate selection or modification of the sheath material, bearing in mind the material intended to be detected.

When crude oil is the conveyed fluid it is desirable to use particular silicone rubber materials in the sheath or to use particular quartz material as the conductive fibre.

Crude oil does not swell silicone rubber as much as some other liquids do and it also appears that some fractionation of the crude oil occurs during its absorption into the rubber.

Conventional quartz has a refractive index about 1.46 and silicone rubber about 1.41. Probably for the reasons mentioned above crude oil absorbed by a silicone rubber sheath may not have the effect of extinguishing the internal reflections in the fibre.

For extinction to be assured when crude oil is the swelling medium, therefore, the difference between the refractive indices of the rubber and quartz must start off in the normal condition narrower than is indicated above, and a silicone rubber of a refractive index of between 1.42 and 1.44 inclusive should be used. Such rubbers are commercially available and an example is Grade OF-8 from Shinetsu Chemical Company, 6-1 2-chome, Ohtemachi, Kyoda-ku, Tokyo, Japan. Alternatively (or additionally) the refractive index of the quartz used may be somewhat lower than is conventional.

In the second embodiment shown in FIGS. 3 and 4 there is shown an arrangement particularly suitable for use when the pipeline is under water and/or for use when the material conducted by the pipeline has a refractive index lower than that of the quartz.

In this arrangement, the pipeline 8 has around at least its upper part a cover 11 which includes a duct 12 within which runs a quartz core 3. The duct 12 is downwardly open but has a closed head at its upper end. The cover is filled with water except at the upper part of the duct 12 where the core 3 is normally surrounded by a sheath of silicone oil 13. This is an oil with a refractive index lower than that of the material of the core 3 so that the core remains internally reflecting.

If the oil or other liquid contained by the pipeline has a refractive index higher than that of the quartz core, then leakage of the leaking liquid will be detected by the leaking liquid being caught by the cover 11 and rising into the duct 12 so that it displaces the silicone oil downwards until the core 3 is surrounded by the leaked liquid. At this stage, light within the core ceases to be totally internally reflected and the change can be detected as the first embodiment.

If however the material in the pipeline is a gas or is a liquid which has a lower refractive index than the core, then a further third liquid 14 immiscible with the silicone oil is entrapped above the latter within the duct, this third liquid 14 having a specific gravity intermediate between that of the silicone oil and the escaping material. It includes a dyestuff or other light absorber. When material escapes from a leak 10 in the pipeline 8' and is trapped within the duct, as indicated in FIG. 4, the third liquid 14 is displaced downward until it surrounds the core 3, the trapped material occupying the volume 15 and the silicone oil being seen below the core at 13. Once more the effect is to change the refractive index of the material surrounding the core 3 and hence its light-conductive capacity.

Obviously it is possible within the framework of this second embodiment to cause a change in conductive condition of the core by displacing from around the core a liquid layer of higher refractive index by means of an escaping material with lower refractive index so that leakage is indicated by the beginning of light transmission along the core rather than by its cessation or attenuation.

I claim:

1. A device for use in combination with a light emitter and a light receiver in detecting a fluid leak from a contained volume adjacent said device and along which said device extends, the device comprising a fibre-optic core having a first refractive index, a sheath around said core of a second refractive index, there being a difference between said first and second refractive indices, the material of said sheath being solid and permeable and of a nature such that said second refractive index is altered by contact with leaked fluid from the contained volume, and protective means about the sheath for permitting access of leaked fluid to at least said sheath, presence of said fluid in said sheath tending to reverse said difference between said first and second refractive indices by acting to alter said second refractive index and detectably alter the internal reflection characteristics of said core.

2. A device according to claim 1 wherein the second refractive index is normally lower than the first but is increased at least to the value of the first by the presence of leaked fluid, whereby a leak of said fluid renders the core non-internally-reflective.

3. A device according to claim 1 or claim 2 wherein the sheath is of silicone rubber.

4. A device according to claim 1 wherein the fibre-optic is of determinate length, in combination with a light emitter at one end of the fibre-optic and a light receiver at the other end of the fibre optic and control means for detecting an alteration in light reception at the light receiver via the fibre optic from the light emitter upon said alteration in refractive index, whereby a leak of fluid is located to within said length.

5. A device according to claim 1 including a permeable outer cladding, a permeable protective elastomeric layer within the cladding, the sheath within the elastomeric layer and the fibre-optic core within the sheath, whereby expansion of the sheath upon absorption of leaked fluid is taken up by compression of the elastomeric layer.

6. A device for use in combination with a light emitter and a light receiver in detecting a fluid leak from a fluid pipeline extending adjacent said device, the device comprising a fibre-optic having a first refractive index, the fibre-optic being normally surrounded by a solid fluid-permeable sheath material of a second refractive index, the first and second refractive indices being different, and means for allowing access of leaked fluid to a region related to said fibre-optic whereby in an abnormal condition to alter the refractive index of said material surrounding said fibre-optic in response to leaked fluid in said region, the relation between said first refractive index and said altered refractive index at least annulling the difference between said first and second refractive indices and detectably altering the internal reflection characteristics of the fibre-optic.

7. A device according to claim 6 wherein the fibre-optic is of determinate length, in combination with a light emitter at one end of the fibre-optic and a light receiver at the other end of the fibre optic and control means for detecting an alteration in light reception at the light receiver via the fibre optic from the light emitter upon said alteration in refractive index, whereby a leak of fluid is located to within said length.

8. A device according to claim 6 which is positioned underwater.

9. In combination, a pipeline carrying a fluid, and, extending along the pipeline in a position so as to be contacted by fluid leaking from the pipeline, a device as claimed in claim 1 or claim 6.

10. A method of detecting a leak of fluid from a pipeline comprising permitting access of said fluid leaking from the pipeline to a solid material surrounding a fibre-optic core, the material being at least partially permeable to said leaked fluid and being of such a nature that its refractive index is altered by contact with the leaked fluid which is permitted to seep into said material to alter a predetermined relationship between the refractive indices of the core and of said surrounding material so as to alter the internal reflection characteristics of the core, and detecting alteration of said characteristics.

11. A method according to claim 10 wherein the leaked fluid is oil.

* * * * *